United States Patent
Wada et al.

(10) Patent No.: US 9,236,187 B2
(45) Date of Patent: *Jan. 12, 2016

(54) MULTILAYER CERAMIC CAPACITOR

(71) Applicant: Murata Manufacturing Co., Ltd., Nagaokakyo-shi, Kyoto-fu (JP)

(72) Inventors: Hiroyuki Wada, Nagaokakyo (JP); Kohei Shimada, Nagaokakyo (JP); Kenji Takagi, Nagaokakyo (JP); Tomomi Koga, Nagaokakyo (JP); Tomotaka Hirata, Nagaokakyo (JP); Hitoshi Nishimura, Nagaokakyo (JP); Hiroki Awata, Nagaokakyo (JP); Sui Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,450

(22) Filed: Feb. 13, 2015

(65) Prior Publication Data

US 2015/0162133 A1 Jun. 11, 2015

Related U.S. Application Data

(63) Continuation of application No. 14/528,996, filed on Oct. 30, 2014, now Pat. No. 9,042,082, which is a continuation of application No. PCT/JP2014/056854, filed on Mar. 14, 2014.

(30) Foreign Application Priority Data

Mar. 19, 2013 (JP) .................................. 2013-056670

(51) Int. Cl.
*H01G 4/30* (2006.01)
*H01G 4/12* (2006.01)
*H01G 4/012* (2006.01)
*H01G 4/224* (2006.01)
*H01G 4/248* (2006.01)

(52) U.S. Cl.
CPC ................. *H01G 4/30* (2013.01); *H01G 4/012* (2013.01); *H01G 4/12* (2013.01); *H01G 4/1209* (2013.01); *H01G 4/1227* (2013.01); *H01G 4/1245* (2013.01); *H01G 4/224* (2013.01); *H01G 4/248* (2013.01)

(58) Field of Classification Search
None
See application file for complete search history.

(56) References Cited

FOREIGN PATENT DOCUMENTS

JP 2007-266223 A 10/2007
JP 2010-50263 A 3/2010

OTHER PUBLICATIONS

Wada et al.; "Multilayer Ceramic Capacitor"; U.S. Appl. No. 14/528,996, filed Oct. 30, 2014.
Official Communication issued in corresponding Japanese Patent Application No. 2015-020927, mailed on Oct. 13, 2015.

*Primary Examiner* — Dion R Ferguson
(74) *Attorney, Agent, or Firm* — Keating & Bennett, LLP

(57) ABSTRACT

A multilayer ceramic capacitor includes a ceramic main body including an inner layer portion including third ceramic layers and a plurality of inner electrodes arranged at interfaces between the third ceramic layers, and first and second outer layer portions respectively including first and second ceramic layers, the first and second ceramic layers being arranged vertically so as to sandwich the inner layer portion. The third ceramic layers and the first and second outer layer portions contain a perovskite-type compound represented by $ABO_3$ where A contains one or more of Ba, Sr, and Ca, B contains one or more of Ti, Zr, and Hf, and O represents oxygen) as a main component. Where a rare-earth element concentration ($C_R$) in the third ceramic layers is compared to a rare-earth element concentration ($C_r$) in outermost layer portions including at least outermost surfaces of the first and second outer layer portions, $C_R > C_r$ (inclusive of $C_r = 0$).

1 Claim, 1 Drawing Sheet

MULTILAYER CERAMIC CAPACITOR

BACKGROUND OF THE INVENTION

1. Field of the Invention

The present invention relates to a multilayer ceramic capacitor containing a dielectric ceramic material.

2. Description of the Related Art

In general, multilayer ceramic capacitors each include a ceramic main body and outer electrodes, as described in Japanese Unexamined Patent Application Publication No. 2008-081351. The ceramic main body includes two main surfaces opposite to each other, two side surfaces opposite to each other, and two end surfaces opposite to each other. The outer electrodes are provided on the two respective end surfaces of the ceramic main body.

The ceramic main body is a multilayer body that includes an inner layer portion and outer layer portions. The inner layer portion includes a plurality of ceramic layers for inner layers and a plurality of inner electrodes arranged at the interfaces between the plurality of ceramic layers for the inner layers. The outer layer portions include a plurality of ceramic layers for outer layers, the plurality of ceramic layers for the outer layers being arranged vertically so as to sandwich the inner layer portion. The inner electrodes are electrically connected to the outer electrodes.

With respect to multilayer ceramic capacitors, as trends toward a reduction in the thickness of individual ceramic layers and an increase in the number of ceramic layers progress, rare-earth elements are often added in order to stabilize the temperature characteristics of capacitance and to ensure the high-temperature load life over the long term in terms of insulation resistance.

Rare-earth elements, however, tend to concentrate at ceramic boundaries or segregated phases. Rare-earth elements are easily eluted in a water-soluble flux. Thus, resistance to elution in the water-soluble flux is disadvantageously reduced.

For this reason, in the case where such a multilayer ceramic capacitor is mounted, a ceramic component can be eluted in an organic acid contained in a water-soluble flux used for soldering. A ceramic main body includes inner electrodes (metal) and a ceramic material having a different linear thermal expansion coefficient from that of the inner electrodes, thus resulting in residual stress. The inner electrodes are two-dimensionally supported by outer layer portions. Thus, the outer layer portions receive relatively high residual stress, compared to portions of the ceramic main body at which the inner electrodes are not located, the portions of the ceramic main body being adjacent to both side surfaces of the ceramic main body on each of the ceramic layers for the inner layers. Accordingly, in the case where a component in the outer layer portions is eluted in the water-soluble flux to embrittle the outer layer portions, changes that occur over time after solder mounting disadvantageously cause a structural defect.

SUMMARY OF THE INVENTION

Preferred embodiments of the present invention provide a multilayer ceramic capacitor having a structure in which elution in an organic acid is inhibited while electrical characteristics and reliability are ensured.

A multilayer ceramic capacitor according to a preferred embodiment of the present invention includes a ceramic main body that includes an inner layer portion including third ceramic layers, the plurality of ceramic layers being stacked, and the inner layer portion including a plurality of inner electrodes arranged at a plurality of interfaces between the third ceramic layers, and first and second outer layer portions respectively including first and second ceramic layers, the first and second ceramic layers being arranged vertically so as to sandwich the inner layer portion, and outer electrodes arranged on the exterior surface of the ceramic main body and electrically connected to the inner electrodes, in which the third ceramic layers contain a perovskite-type compound represented by $ABO_3$ (where A contains one or more of Ba, Sr, and Ca; and B contains one or more of Ti, Zr, and Hf; and O represents oxygen) as a main component and a rare-earth element, an outermost layer portion including at least an outermost surface of at least one of the first and second outer layer portions contains a perovskite-type compound represented by $A'B'O_3$ (where A' contains one or more of Ba, Sr, and Ca; B' contains one or more of Ti, Zr, and Hf; and O represents oxygen) as a main component, and where a rare-earth element concentration ($C_R$) in the third ceramic layers is compared to a rare-earth element concentration ($C_r$) in the outermost layer portion, $C_R > C_r$ (inclusive of $C_r = 0$).

Here, the rare-earth element concentration ($C_R$) in the third ceramic layers is a rare-earth element content expressed in units of parts by mole with respect to 100 parts by mole of the total amount of Ti, Zr, and Hf that are the B-site components in $ABO_3$ in the third ceramic layers. The rare-earth element concentration ($C_r$) in the outermost layer portion is a rare-earth element content in units of parts by mole with respect to 100 parts by mole of the total amount of Ti, Zr, and Hf that are the B-site components in $A'B'O_3$ in the outermost layer portion.

In the multilayer ceramic capacitor according to a preferred embodiment of the present invention, preferably, the rare-earth element concentration ($C_R$) in the third ceramic layers is about 0.3 parts by mole or more with respect to 100 parts by mole of the total amount of Ti, Zr, and Hf that are the B-site components in $ABO_3$ in the third ceramic layers, and the rare-earth element concentration ($C_r$) in the outermost layer portion is less than about 0.3 parts by mole with respect to 100 parts by mole of the total amount of Ti, Zr, and Hf that are the B-site components in $A'B'O_3$ in the outermost layer portion.

In the multilayer ceramic capacitor according to a preferred embodiment of the present invention, preferably, the molar quantities of metal element components except the rare-earth element in the third ceramic layers are equal or substantially equal to those in the outermost layer portion.

In the multilayer ceramic capacitor according to a preferred embodiment of the present invention, preferably, where a Mn concentration ($C_M$) in the third ceramic layers is compared to a Mn concentration ($C_m$) in the outermost layer portion, $C_M > C_m$ (inclusive of $C_m = 0$).

In the multilayer ceramic capacitor according to a preferred embodiment of the present invention, preferably, where the Mn concentration in the third ceramic layers is denoted by a parts by mole with respect to 100 parts by mole of the total amount of Ti, Zr, and Hf that are the B-site components in $ABO_3$ in the third ceramic layers and where the Mn concentration in the outermost layer portion is denoted by b parts by mole with respect to 100 parts by mole of the total amount of Ti, Zr, and Hf that are the B-site components in $A'B'O_3$ in the outermost layer portions, a ≥ about 0.08 parts by mole, and b ≤ about 0.9×a (b is about 90% or less of a).

In the multilayer ceramic capacitor according to a preferred embodiment of the present invention, preferably, the molar quantities of metal element components except the rare-earth element and Mn in the third ceramic layers are equal or substantially equal to those in the outermost layer portion.

In the multilayer ceramic capacitor according to a preferred embodiment of the present invention, where the rare-earth element concentration ($C_R$) in the third ceramic layers is compared to the rare-earth element ($C_r$) in the outermost layer portion, $C_R > C_r$ (inclusive of $C_r = 0$). The electrical characteristics and reliability of the multilayer ceramic capacitor are influenced by the third ceramic layers. Thus, a multilayer ceramic capacitor having excellent resistance to elution is provided while the electrical characteristics and the reliability are ensured. Moreover, a reduction in the concentration of the rare-earth element, which is expensive, in the outermost layer portion provides an inexpensive multilayer ceramic capacitor.

In the multilayer ceramic capacitor according to a preferred embodiment of the present invention, where the rare-earth element concentration ($C_R$) in the third ceramic layers is about 0.3 parts by mole or more with respect to 100 parts by mole of the total amount of Ti, Zr, and Hf that are the B-site components in $ABO_3$ in the third ceramic layers and where the rare-earth element concentration ($C_r$) in the outermost layer portion is less than about 0.3 parts by mole with respect to 100 parts by mole of the total amount of Ti, Zr, and Hf that are the B-site components in $A'B'O_3$ in the outermost layer portion, a multilayer ceramic capacitor having excellent resistance to elution is provided while the electrical characteristics and the reliability are ensured.

In the multilayer ceramic capacitor according to a preferred embodiment of the present invention, where a Mn concentration ($C_M$) in the third ceramic layers is compared to a Mn concentration ($C_m$) in the outermost layer portion, if $C_M > C_m$ (inclusive of $C_m = 0$), the color of the main surfaces of the ceramic main body differs from the color of the side surfaces of the ceramic main body.

Where the Mn concentration in the third ceramic layers is denoted by a parts by mole with respect to 100 parts by mole of the total amount of Ti, Zr, and Hf that are the B-site components in $ABO_3$ in the ceramic layers for the inner layers and where the Mn concentration in the outermost layer portion is denoted by b parts by mole with respect to 100 parts by mole of the total amount of Ti, Zr, and Hf that are the B-site components in $A'B'O_3$ in the outermost layer portions, if a≥about 0.08 parts by mole, and b≤about 0.9×a (b is about 90% or less of a), the color of the main surfaces of the ceramic main body further differs from the color of the side surfaces of the ceramic main body. In this case, the main surfaces can be visually discriminated from the side surfaces, so that the stacking direction of the inner electrodes is capable of being determined from the appearance of the multilayer ceramic capacitor. It is thus possible to mount the multilayer ceramic capacitor with a desired positional relationship between a substrate and the inner electrodes of the multilayer ceramic capacitor.

According to a preferred embodiment of the present invention, a multilayer ceramic capacitor includes a ceramic main body including a first outer layer portion including first ceramic layers, a second outer layer portion including second ceramic layers, an inner layer portion including third ceramic layers and inner electrodes arranged at a plurality of interfaces between at least some of the third ceramic layers, and outer electrodes arranged on surfaces of the ceramic main body and electrically connected to the inner electrodes, wherein the first outer layer portion and the second outer layer portion are arranged vertically so as to sandwich the inner layer portion therebetween, the third ceramic layers contain a perovskite-type compound represented by $ABO_3$, where A contains one or more of Ba, Sr, and Ca; B contains one or more of Ti, Zr, and Hf; and O represents oxygen, and a rare-earth element, an outermost layer portion of at least one of the first and the second outer layer portions including at least a portion of a surface of the ceramic main body contains a perovskite-type compound represented by $A'B'O_3$, where A' contains one or more of Ba, Sr, and Ca; B' contains one or more of Ti, Zr, and Hf; and O represents oxygen, and optionally a rare-earth element that is the same or different as the rare-earth element of the third ceramic layers, a mol concentration ($C_R$) of the rare-earth element in the third ceramic layers is greater than a mol concentration ($C_r$) of the rare-earth element in the outermost layer portion, $C_R > C_r$, inclusive of $C_r = 0$, the mol concentration ($C_R$) is about 0.3 parts by mole or more with respect to 100 parts by mole of total amount of Ti, Zr, and Hf included in the third ceramic layers, and the mol concentration ($C_r$) is less than about 0.3 parts by mole with respect to 100 parts by mole of total amount of Ti, Zr, and Hf included in the outermost layer portions.

Alternatively in the preferred embodiment of the present invention described in the preceding paragraph, an entirety of the surface of the ceramic main body preferably contains the perovskite-type compound represented by $A'B'O_3$.

According to a preferred embodiment of the present invention, a multilayer ceramic capacitor includes a ceramic main body including a first outer layer portion including first ceramic layers, a second outer layer portion including second ceramic layers, an inner layer portion including third ceramic layers and inner electrodes arranged at a plurality of interfaces between at least some of the third ceramic layers, and outer electrodes arranged on surfaces of the ceramic main body and electrically connected to the inner electrodes, wherein the first outer layer portion and the second outer layer portion are arranged vertically so as to sandwich the inner layer portion therebetween, the third ceramic layers contain a perovskite-type compound represented by $ABO_3$, where A contains one or more of Ba, Sr, and Ca; B contains one or more of Ti, Zr, and Hf; and O represents oxygen, a rare-earth element, and Mn, an outermost layer portion of at least one of the first and the second outer layer portions including a portion of a surface of the ceramic main body contains a perovskite-type compound represented by $A'B'O_3$, where A' contains one or more of Ba, Sr, and Ca; B' contains one or more of Ti, Zr, and Hf; and O represents oxygen, and optionally Mn and a rare-earth element that is the same or different as the rare-earth element of the third ceramic layers, a mol concentration ($C_R$) of the rare-earth element in the third ceramic layers is greater than a mol concentration ($C_r$) of the rare-earth element in the outermost layer portion, $C_R > C_r$, inclusive of $C_r = 0$, and a mol concentration ($C_M$) of Mn in the third ceramic layers is greater than a mol concentration ($C_m$) of Mn in the outermost layer portion, $C_M > C_m$ (inclusive of $C_m = 0$).

Alternatively in the preferred embodiment of the present invention described in the preceding paragraph, an entirety of the surface of the ceramic main body preferably contains the perovskite-type compound represented by $A'B'O_3$.

According to a preferred embodiment of the present invention, a multilayer ceramic capacitor includes a ceramic main body a first outer layer portion including first ceramic layers, a second outer layer portion including second ceramic layers, an inner layer portion including third ceramic layers and inner electrodes arranged at a plurality of interfaces between at least some of the third ceramic layers, and outer electrodes arranged on surfaces of the ceramic main body and electrically connected to the inner electrodes, wherein the first outer layer portion and the second outer layer portion are arranged vertically so as to sandwich the inner layer portion therebetween, the third ceramic layers contain a perovskite-type compound represented by $ABO_3$, where A contains one or more of Ba, Sr, and Ca; B contains one or more of Ti, Zr, and Hf; and O represents oxygen, a rare-earth element, and Mn, and only the second outer layer portion of the first and second outer layer portions includes each of features (a), (b), (c) and (d):

(a) an outermost layer portion of at least one of the first and the second outer layer portions including a portion of a surface of the ceramic main body contains a perovskite-type compound represented by $A'B'O_3$, where A' contains one or more of Ba, Sr, and Ca, B' contains one or more of Ti, Zr, and Hf, and O represents oxygen, and optionally Mn and a rare-earth element that is the same or different than the rare-earth element of the third ceramic layers;

(b) a mol concentration ($C_R$) of the rare-earth element in the third ceramic layers is greater than a mol concentration ($C_r$) of the rare-earth element in the outermost layer portion, $C_R > C_r$, inclusive of $C_r = 0$; and (c) a mol concentration ($C_M$) of Mn in the third ceramic layers is greater than a mol concentration ($C_m$) of Mn in the outermost layer portion, $C_M > C_m$ (inclusive of $C_m = 0$); and (d) an intermediate ceramic layer is arranged between the outermost layer portion and the inner layer portion, and the intermediate ceramic layer has a different composition from the outermost layer portion.

In the preferred embodiment of the present invention described in the preceding paragraph, it is preferable that the first outer layer portion includes any one, two or three of features (a), (b), (c) and (d), and wherein feature (a) is an outermost layer portion of the first outer layer portion including a portion of a surface of the ceramic main body contains a perovskite-type compound represented by $A'B'O_3$, where A' contains one or more of Ba, Sr, and Ca, B' contains one or more of Ti, Zr, and Hf, and O represents oxygen, and optionally Mn and a rare-earth element that is the same or different than the rare-earth element of the third ceramic layers.

Alternatively in the preferred embodiment of the present invention described in the preceding two paragraphs, an entirety of the surface of the ceramic main body preferably contains the perovskite-type compound represented by $A'B'O_3$.

Alternatively in the preferred embodiment of the present invention described in the preceding two paragraphs, the mol concentration (Cr) of the rare-earth element in the outermost layer portion preferably is smaller than a mol concentration of the rare-earth element in the outermost layer portion of the first outer layer portion including the portion of the surface of the ceramic main body.

According to various preferred embodiments of the present invention, first and second ceramic layers having excellent resistance to elution are provided. Thus, a multilayer ceramic capacitor having a structure in which elution in an organic acid is inhibited is provided while electrical characteristics and reliability are ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A multilayer ceramic capacitor according to various preferred embodiments of the present invention and a method for producing the multilayer ceramic capacitor will be described below.

Figure 1:
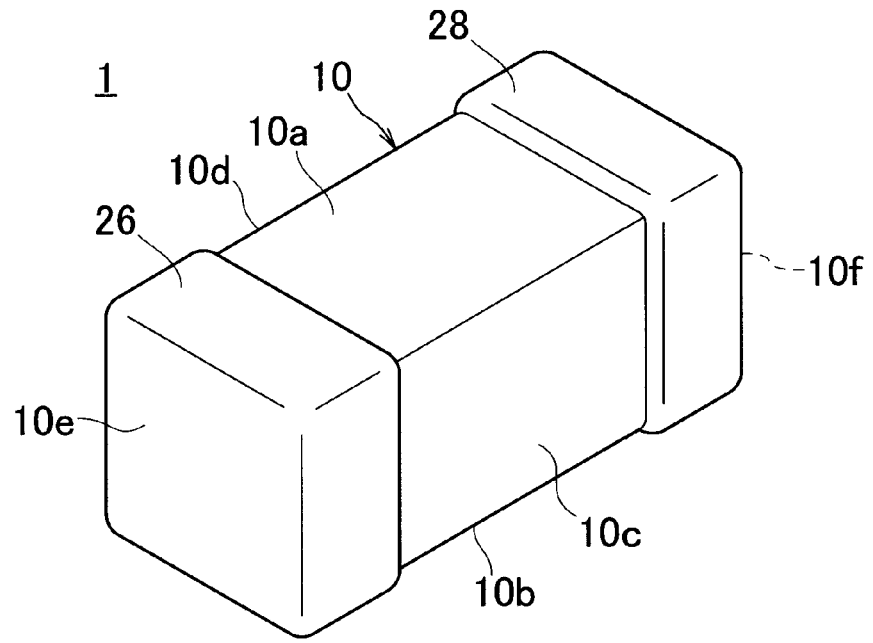
FIG. 1 is a perspective view of a multilayer ceramic capacitor according to a preferred embodiment of the present invention.
Figure 2:
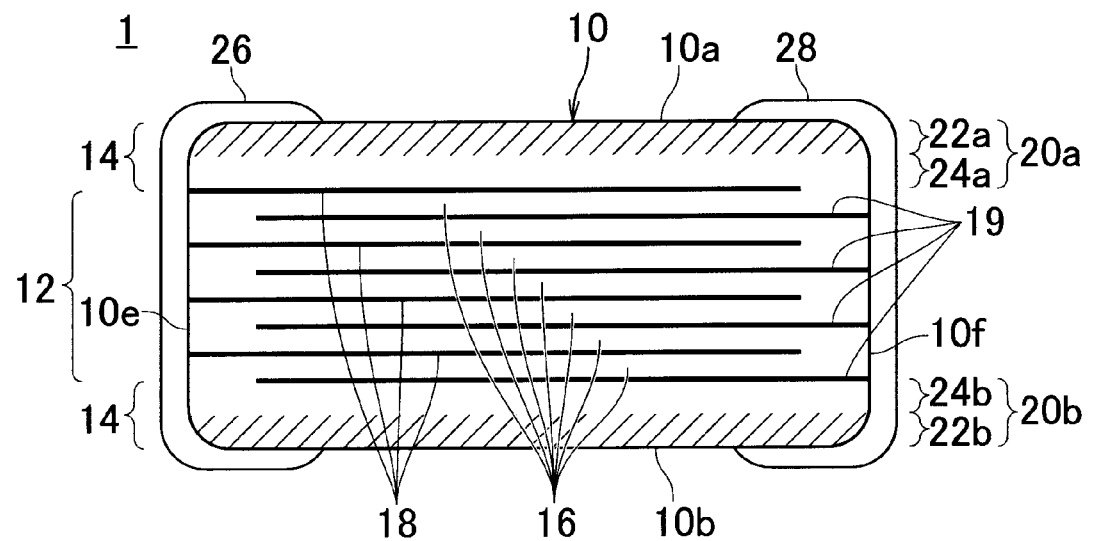
FIG. 2 is a schematic cross-sectional view of the internal structure of the multilayer ceramic capacitor illustrated in FIG. 1.

FIG. 1 is a perspective view of a multilayer ceramic capacitor according to a preferred embodiment of the present invention. FIG. 2 is a schematic cross-sectional view illustrating the internal structure of the multilayer ceramic capacitor. A multilayer ceramic capacitor 1 includes a ceramic main body 10, and outer electrodes 26 and 28 arranged on left and right end portions of the ceramic main body 10.

The ceramic main body 10 includes a main surface (upper surface) 10a and a main surface (surface to be mounted) 10b, which are opposite to each other, a side surface 10c and a side surface 10d, which are opposite to each other, an end surface 10e and an end surface 10f, which are opposite to each other.

The ceramic main body 10 has a multilayer structure that includes an inner layer portion 12 and first and second outer layer portions 14. The inner layer portion 12 includes a plurality of ceramic layers 16 for inner layers, hereinafter referred to as third ceramic layers, and a plurality of inner electrodes 18 and 19 arranged at interfaces between the third ceramic layers 16. The first and second outer layer portions 14 respectively include first and second ceramic layers 20a and 20b, the first and second ceramic layers 20a and 20b being arranged vertically so as to sandwich the inner layer portion 12.

The inner electrodes 18 and the inner electrodes 19 are arranged so as to oppose each other with the third ceramic layers 16 interposed therebetween in the thickness direction, the third ceramic layers 16 preferably being composed of a dielectric substance. Electrostatic capacitance is generated in portions where the inner electrodes 18 and the inner electrodes are arranged to oppose each other with the third ceramic layers 16 interposed therebetween. The inner electrodes 18 and 19 are preferably composed of, for example, Cu, Ni, or an alloy of these metals.

The left end portion of each of the inner electrodes 18 extends to the left end surface 10e of the ceramic main body 10 and is electrically connected to the outer electrodes 26. The right end portion of each of the inner electrodes 19 extends to the right end surface 10f of the ceramic main body 10 and is electrically connected to the outer electrode 28.

The main component of the third ceramic layers 16 included in the inner layer portion 12 is preferably a perovskite-type compound represented by $ABO_3$, where A contains one or more of Ba, Sr, and Ca; B contains one or more of Ti, Zr, and Hf; and O represents oxygen. For example, the main component of the third ceramic layers 16 may preferably be a perovskite-type compound, for example, $BaTiO_3$ or $CaZrO_3$.

In the first and second ceramic layers 20a and 20b, some layers including the outermost layers are ceramic layers 22a and 22b each preferably having a low rare-earth element concentration and defining the outermost layer portions. The remaining layers are intermediate ceramic layers 24a and 24b each preferably containing the same main component as the third ceramic layers 16. However, all of the layers of the first and second ceramic layers 20a and 20b may be the ceramic layers 22a and 22b each having a low rare-earth element concentration and defining the outermost layer portions. The ceramic layer 22a or 22b having a low rare-earth element concentration and defining the outermost layer portion may be arranged in only one of the ceramic layers 20a and 20b for the outer layers. The intermediate ceramic layers 24a and 24b may contain a different main component from the third ceramic layers 16.

The main component of the ceramic layers 22a and 22b each having a low rare-earth element concentration and defining the outermost layer portions is preferably a perovskite-type compound represented by A'B'O$_3$, where A' contains one or more of Ba, Sr, and Ca; B' contains one or more of Ti, Zr, and Hf; and O represents oxygen. For example, the main component of the ceramic layers 22a and 22b may preferably be a perovskite-type compound, such as, BaTiO$_3$ or CaZrO$_3$.

When a rare-earth element concentration ($C_R$) in the third ceramic layers 16 included in the inner layer portion 12 is compared to a rare-earth element concentration ($C_r$) in the ceramic layers 22a and 22b, $C_R > C_r$ (inclusive of $C_r = 0$). Examples of the rare-earth element (R) include Dy, Gd, Y, and La.

Where the third ceramic layers 16 included in the inner layer portion 12 have a rare-earth element (R) content of about 0.3 parts by mole or more with respect to 100 parts by mole of the total amount of Ti, Zr, and Hf that are the B-site components in the perovskite-type compound (ABO$_3$), the rare-earth element (R) concentration in the ceramic layers 22a and 22b included in the first and second outer layer portions 14 is preferably less than about 0.3 parts by mole with respect to 100 parts by mole of the total amount of Ti, Zr, and Hf that are the B-site components in the perovskite-type compound (A'B'O$_3$).

It is preferable that the molar quantities of metal element components except the rare-earth element in the third ceramic layers 16 included in the inner layer portion 12 be equal or substantially equal to those in the ceramic layers 22a and 22b. In this case, the production process is simplified. Where the third ceramic layers are in contact with the ceramic layers 22a and 22b, a reduction in bonding strength is inhibited.

Where a Mn concentration ($C_M$) in the third ceramic layers 16 included in the inner layer portion 12 is compared to a Mn concentration ($C_m$) in the ceramic layers 22a and 22b being included in the first and second outer layer portions 14, it is preferable that $C_M > C_m$ (inclusive of $C_m = 0$).

Where the Mn concentration in the third ceramic layers 16 included in the inner layer portion 12 is denoted by a parts by mole with respect to 100 parts by mole of the total amount of Ti, Zr, and Hf that are the B-site components in ABO$_3$ and where the Mn concentration in the ceramic layers 22a and 22b included in the first and second outer layer portions 14 is denoted by b parts by mole with respect to 100 parts by mole of the total amount of Ti, Zr, and Hf that are the B-site components in A'B'O$_3$, it is preferable that a≥about 0.08 parts by mole and that b≤about 0.9×a (b is about 90% or less of a).

It is preferable that the molar quantities of metal element components except the rare-earth element and Mn in the third ceramic layers 16 included in the inner layer portion 12 be equal or substantially equal to those in the ceramic layers 22a and 22b. In this case, the production process is simplified. Where the third ceramic layers 16 are in contact with the ceramic layers 22a and 22b, a reduction in bonding strength is inhibited.

In the multilayer ceramic capacitor 1 illustrated in FIG. 2, the rare-earth element concentration in the ceramic layers 22a and 22b included in the first and second outer layer portions 14 is preferably lower than the rare-earth element concentration in the third ceramic layers 16. Thus, the ceramic layers 22a and 22b are less likely to be dissolved in an organic acid, thereby resulting in the first and second ceramic layers 20a and 20b having excellent resistance to elution.

Regarding the various features discussed above, for convenience of description, the following features will be referred to as features (a), (b), (c) and (d):

(a) an outermost layer portion of at least one of the first and the second outer layer portions including a portion of a surface of the ceramic main body contains a perovskite-type compound represented by A'B'O$_3$, where A' contains one or more of Ba, Sr, and Ca, B' contains one or more of Ti, Zr, and Hf, and O represents oxygen, and optionally Mn and a rare-earth element that is the same or different than the rare-earth element of the third ceramic layers;

(b) a mol concentration ($C_R$) of the rare-earth element in the third ceramic layers is greater than a mol concentration ($C_r$) of the rare-earth element in the outermost layer portion, $C_R > C_r$, inclusive of $C_r = 0$; and (c) a mol concentration ($C_M$) of Mn in the third ceramic layers is greater than a mol concentration ($C_m$) of Mn in the outermost layer portion, $C_M > C_m$ (inclusive of $C_m = 0$); and (d) an intermediate ceramic layer is arranged between the outermost layer portion and the inner layer portion, and the intermediate ceramic layer has a different composition from the outermost layer portion.

In one preferred embodiment of the present invention, only the second outer layer portion of the first and second outer layer portions includes each of features (a), (b), (c) and (d).

In another preferred embodiment of the present invention, the first outer layer portion includes any one, two or three of features (a), (b), (c) and (d), and wherein feature (a) is an outermost layer portion of the first outer layer portion including a portion of a surface of the ceramic main body contains a perovskite-type compound represented by A'B'O$_3$, where A' contains one or more of Ba, Sr, and Ca, B' contains one or more of Ti, Zr, and Hf, and O represents oxygen, and optionally Mn and a rare-earth element that is the same or different than the rare-earth element of the third ceramic layers.

Feature (a) described above preferably is configured such that only a portion of a surface of the ceramic main body contains a perovskite-type compound represented by A'B'O$_3$.

However, it is also possible that an entirety of the surface of the ceramic main body contains the perovskite-type compound represented by A'B'O$_3$.

In addition, it is also possible that the mol concentration (Cr) of the rare-earth element in the outermost layer portion is smaller than a mol concentration of the rare-earth element in the outermost layer portion of the first outer layer portion including the portion of the surface of the ceramic main body.

In the multilayer ceramic capacitor 1 illustrated in FIG. 2, where the Mn concentration in the ceramic layers 22a and 22b included in the outer layer portions 14 is lower than the Mn concentration in the third ceramic layers 16 included in the inner layer portion 12, the color of the main surfaces 10a and 10b (the ceramic layers 22a and 22b) of the ceramic main body 10 is lighter than that of the side surfaces 10c and 10d (primarily, the third ceramic layers 16 included in the inner layer portion 12). The different colors are easily visually discriminable. Thus, the direction of the multilayer ceramic capacitor 1 is discriminable by observing the multilayer ceramic capacitor 1 with, for example, an image-pickup camera. Thus, the mounting direction can be easily determined and aligned.

To enable the main surfaces 10a and 10b of the ceramic main body 10 to have a different color from that of the side surfaces 10c and 10d, for example, V may also be used as an element whose content in the ceramic layers 22a and 22b is different from that in the third ceramic layers 16. Mn is more preferable because of its larger difference in color corresponding to the difference in content.

As a result, for example, all of the multilayer ceramic capacitors 1 preferably are mounted such that the inner electrodes 18 and 19 are parallel or substantially parallel to a printed circuit board (printed circuit substrate). Thus, the value of stray capacitance generated between the inner electrodes 18 and 19 and the printed circuit board is less likely to vary from lot to lot, thus reducing variations in the electrical characteristics of the mounted multilayer ceramic capacitors 1.

A non-limiting example of a method for producing the multilayer ceramic capacitor 1 will be described below.

A $BaCO_3$ powder and a $TiO_2$ powder are weighed such that the Ba/Ti ratio is 1.000. They are wet-mixed using a ball mill. The resulting slurry mixture is dried and then heated to about 1050° C., thereby producing a main-component $BaTiO_3$ powder having a specific surface area of 2.9 $m^2/g$.

Next, $Dy_2O_3$, $MnCO_3$, $MgCO_3$, $BaCO_3$, and $SiO_2$ are prepared as additive powders. Then, about 0.15 parts by mole of $Dy_2O_3$, about 0.3 parts by mole of $MnCO_3$, about 1.0 part by mole of MgO, about 1.0 part by mole of $BaCO_3$, and about 1.5 parts by mole of $SiO_2$ are added thereto with respect to 100 parts by mole of the main-component $BaTiO_3$ powder. The resulting mixture is wet-mixed using a ball mill together with deionized water defining and serving as a dispersion medium, thus providing a slurry.

The removal of water in the slurry results in a dry powder. The dry powder is size-selected to provide a ceramic raw-material powder for inner layers. A polybutyral-based binder and a plasticizer are added to the ceramic raw-material powder for the inner layers. Then a dispersion medium mixture of toluene and ethyl alcohol is added thereto. The resulting mixture is wet-mixed using a ball mill, thereby preparing a slurry for sheet formation. The slurry for sheet formation is formed into a sheet shape using a gravure coater, thereby providing green sheets for inner layers, and the green sheets each having a thickness of about 3.3 µm. The green sheets for the inner layers are fired to provide the ceramic layers 16 for the inner layers, the ceramic layers 16 each having a thickness of about 2.8 µm.

A main-component $BaTiO_3$ powder is prepared by the foregoing method. $Dy_2O_3$, $MnCO_3$, $MgCO_3$, $BaCO_3$, and $SiO_2$ are prepared as additive powders. Then, about 0.1 parts by mole of $Dy_2O_3$, about 0.3 parts by mole of $MnCO_3$, about 1.0 part by mole of MgO, about 1.0 part by mole of $BaCO_3$, and about 1.5 parts by mole of $SiO_2$ are added with respect to 100 parts by mole of $BaTiO_3$. A polybutyral-based binder and a plasticizer are added to the weighed powders. Then toluene and ethyl alcohol are added thereto. The resulting mixture is wet-mixed using a ball mill, thereby preparing a slurry for sheet formation. The slurry for sheet formation is formed into a sheet shape using a gravure coater, thereby providing green sheets each having a low rare-earth element concentration.

A conductive paste containing Ni as a main component is applied by screen printing on the green sheets for the inner layers, thereby forming conductive paste film (conductor pattern) to be formed into the inner electrodes 18 and 19. Then, 316 sheets of the green sheets, on which the conductive paste films have been formed, for the inner layers are stacked such that end portions of the conductive paste films extend alternately in opposite directions.

The green sheet layers for the outer layers are stacked vertically so as to sandwich the stacked green sheets for the inner layers. That is, the green sheets for the outer layers are stacked to a thickness of about 180 µm, the green sheets being composed of the same or substantially the same material as the green sheets for the inner layers and not including a conductive paste film. The green sheets each having a low rare-earth element concentration are stacked to a thickness of about 40 µm on the outer side portions of the stacked green sheets for the outer layers. This results in a green ceramic main body 10 to be formed into the main body of the multilayer ceramic capacitor 1.

The green ceramic main body 10 is cut into a predetermined product size. The cut green ceramic main body 10 is heat-treated at 280° C. in a $N_2$ atmosphere, thereby burning and removing the binder. The temperature of the green ceramic main body 10 is increased to 1280° C. at a rate of temperature increase of 5° C./min at 800° C. or higher in a reducing atmosphere of $N_2$—$H_2$—$H_2O$ gas. The green ceramic main body 10 is held at 1280° C. for 100 minutes for firing, thereby resulting in the sintered ceramic main body 10.

The green sheets for the inner layers, the green sheets for the outer layers, the green sheets each having a low rare-earth element concentration, and the conductive paste films are co-fired. As a result, the green sheets for the inner layers are formed into the third ceramic layers 16. The green sheets each having a low rare-earth element concentration are formed into the ceramic layers 22a and 22b each having a thickness of about 30 µm, the ceramic layers 22a and 22b defining the outermost layer portions. The green sheets for the outer layers are formed into the intermediate ceramic layers 24a and 24b each having a thickness of about 150 µm. The conductive paste films are formed into the inner electrodes 18 and 19. The sintered ceramic main body 10 is about 3.1 mm long, about 1.5 mm wide, and about 1.5 mm high and has a prism shape with a square cross-sectional shape.

A Cu paste is applied to the end surfaces 10e and 10f of the sintered ceramic main body 10. The sintered ceramic main body 10 is heated to 800° C. in a $N_2$ atmosphere to bake the Cu paste, thereby forming the outer electrodes 26 and 28 electrically connected to the inner electrodes 18 and 19. Then Ni—Sn coatings are formed by wet plating on the surface layers of the outer electrodes 26 and 28, thereby providing a multilayer ceramic capacitor.

There are various non-limiting examples of multilayer ceramic capacitors having various sizes, for example, a size of about 3.2 mm long, about 1.6 mm wide, and about 1.6 mm high, a size of about 1.0 mm long, about 0.5 mm wide, and about 0.5 mm high, and a size of about 1.0 mm long, about 0.5 mm wide, and about 0.3 mm high. The present invention is applicable to these multilayer ceramic capacitors.

Examples and Comparative Examples

Multilayer ceramic capacitors 1 according to examples and comparative examples were produced by the production method described in the foregoing preferred embodiments of the present invention, except for aspects described below and the amounts of $Dy_2O_3$, $MnCO_3$, MgO, $SiO_2$, $Gd_2O_3$, $Y_2O_3$, and $La_2O_3$ added in each layer. An evaluation of the characteristics was conducted. Table 1 describes the amounts of metal elements (Dy, Mn, Mg, Si, Gd, Y, and La) in $Dy_2O_3$, $MnCO_3$, MgO, $SiO_2$, $Gd_2O_3$, $Y_2O_3$, and $La_2O_3$ added in each layer with respect to 100 parts by mole of the total amount of the B-site components (Ti, Zr, and Hf) in the main-component powder. The composition of the intermediate ceramic layers was the same or substantially the same as that of the ceramic layers for the inner layers.

In Example 1 and Example 2, all of the layers in the first and second ceramic layers 20a and 20b were defined by the ceramic layers 22a and 22b each having a low rare-earth element concentration, the first and second ceramic layers 20a and 20b being included in the outer layer portions 14 and being arranged vertically. The ceramic layers 22a and 22b (that is, the first and second ceramic layers 20a and 20b) each had a thickness of about 220 μm prior to firing.

In Example 3, regarding the first and second ceramic layers 20a and 20b, the first and second ceramic layers 20a and 20b being included in the outer layer portions 14 and being arranged vertically, some of the layers including the outermost layers were defined by the ceramic layers 22a and 22b having a low rare-earth element concentration. The remaining layers were defined by the intermediate ceramic layers 24a and 24b. The ceramic layers 22a and 22b each had a thickness of about 40 μm prior to firing. The intermediate ceramic layers 24a and 24b each had a thickness of about 180 μm prior to firing. Thus, the first and second ceramic layers 20a and 20b each had a thickness of about 220 μm prior to firing.

In Example 4, all of the layers in the first ceramic layer 20a were defined by the intermediate ceramic layers 24a, the first ceramic layer 20a being included in the outer layer portion 14 and being arranged at the upper side portion. The intermediate ceramic layers 24a (that is, the first ceramic layer 20a) had a thickness of about 220 μm prior to firing. Meanwhile, some layers including the outermost layer in the second ceramic layer 20b were defined by the ceramic layers 22b having a low rare-earth element concentration and defining the outermost layer portion, the second ceramic layer 20b being included in the outer layer portion 14 and being arranged at the lower side portion. The remaining layers were defined by the intermediate ceramic layers 24b. The ceramic layers 22b had a thickness of about 180 μm prior to firing. The intermediate ceramic layers 24b had a thickness of about 40 μm prior to firing. Thus, the second ceramic layer 20b had a thickness of about 220 μm prior to firing.

In Examples 5 to 24, as with Example 1, all of the layers in the first and second ceramic layers 20a and 20b were defined by the ceramic layers 22a and 22b having a low rare-earth element concentration, the first and second ceramic layers 20a and 20b being included in the outer layer portions 14 and being arranged vertically. In Examples 12 to 17 and Example 24, a Mn concentration in the material for the green sheets having a low rare-earth element concentration and defining the outermost layer portions, the green sheets to be formed into the ceramic layers 22a and 22b, was lower than a Mn concentration in the green sheets for the inner layers.

Regarding the rare-earth element in the green sheets having a low rare-earth element concentration, Gd was used in Example 8. Y was used in Example 9. La was used in Example 10. Dy was used in all other examples.

Regarding the main component of the green sheets for the inner layers, a $(Ba_{0.93}Ca_{0.07})TiO_3$ powder was used in Example 18. A $(Ba_{0.99}Sr_{0.01})TiO_3$ powder was used in Example 19. A $Ba(Ti_{0.98}Zr_{0.02})O_3$ powder was used in Example 20. A $Ba(Ti_{0.99}Hf_{0.01})O_3$ powder was used in Example 21.

Regarding the main-component powder for the green sheets having a low rare-earth element concentration, a $(Ba_{0.93}Ca_{0.07})TiO_3$ powder was used in Example 18. A $(Ba_{0.99}Sr_{0.01})TiO_3$ powder was used in Example 19. A $Ba(Ti_{0.98}Zr_{0.02})O_3$ powder was used in Example 20. A $Ba(Ti_{0.99}Hf_{0.01})O_3$ powder was used in Example 21. A $(Ba_{0.93}Ca_{0.07})TiO_3$ powder was used in Example 22.

In Comparative Examples 1 to 6, as with conventional multilayer ceramic capacitors, all of the layers in the first and second ceramic layers 20a and 20b were defined by the intermediate ceramic layers 24a and 24b, the first and second ceramic layers 20a and 20b being included in the outer layer portions 14 and being arranged vertically.

Regarding the main-component powder for the green sheets for the inner layers, a $(Ba_{0.93}Ca_{0.07})TiO_3$ powder was used in Comparative Example 2. A $(Ba_{0.99}Sr_{0.01})TiO_3$ powder was used in Comparative Example 3. A $Ba(Ti_{0.98}Zr_{0.02})O_3$ powder was used in Comparative Example 4. A $Ba(Ti_{0.99}Hf_{0.01})O_3$ powder was used in Comparative Example 5.

Regarding the main-component powder for the green sheets for the outer layers, a $(Ba_{0.93}Ca_{0.07})TiO_3$ powder was used in Comparative Example 2. A $(Ba_{0.99}Sr_{0.01})TiO_3$ powder was used in Comparative Example 3. A $Ba(Ti_{0.98}Zr_{0.02})O_3$ powder was used in Comparative Example 4. A $Ba(Ti_{0.99}Hf_{0.01})O_3$ powder was used in Comparative Example 5. A $(Ba_{0.93}Ca_{0.07})TiO_3$ powder was used in Comparative Example 6.

In Examples 1 to 24 and Comparative Examples 1 to 6, the raw-material powders in the prepared slurries for sheet formation were dissolved in an acid and analyzed by ICP emission spectroscopy. The results demonstrated that the raw-material powders had the same or substantially the same compositions as those described in Table 1.

In Examples 1 to 24 and Comparative Examples 1 to 6, the ceramic layers for the inner layers (which were not isolated from the inner Ni electrodes because it is difficult to perform isolation from the inner electrodes) and the outermost layer portions were extracted by grinding from the multilayer bodies (ceramic main bodies) after the removal of the outer electrodes of the multilayer ceramic capacitors produced. They were dissolved in an acid and analyzed by ICP emission spectroscopy. The results demonstrated that the resulting compositions were equal or substantially equal to the compositions described in Table 1, except for the inner-electrode component, Ni.

Evaluation of Characteristics in Example and Comparative Example

Characteristics of the multilayer ceramic capacitors 1 in examples and comparative examples were evaluated as described below.

In a sample bottle containing 30 mL of a 0.2 mol/L adipic acid solution, 40 pieces of the multilayer ceramic capacitors 1 for each capacitor type were immersed. The sample bottle was sealed and allowed to stand at 85° C. for 120 hours. After cooling, the multilayer ceramic capacitors 1 were taken out. The multilayer ceramic capacitors 1 were washed with 20 mL of deionized water. Next, the ceramic components, i.e., Ba, Ti Dy, Gd, Y, La, Mg, Mn, and Si, contained in 5 mL of the resulting eluate were quantified by ICP emission spectroscopy. The total amount of the elements detected was determined in units of μmol.

The color of the main surfaces 10a and 10b and the color of the side surfaces 10c and 10d of the multilayer ceramic capacitor 1 were visually observed.

For each capacitor type, 20 pieces of the multilayer ceramic capacitors 1 that have been immersed in the adipic acid solution were solder-mounted on a printed circuit board with a water-soluble flux containing adipic acid as a main component.

After the solder mounting, the 20 pieces of the multilayer ceramic capacitors 1 were allowed to stand at room temperature for 24 hours and then ground to expose a vertical section (LT section) in the longitudinal direction. Whether a structural defect, such as a crack, occurred or not was observed with an optical microscope.

Twenty pieces of the multilayer ceramic capacitors 1 for each capacitor type were subjected to a high-temperature load reliability test. The high-temperature load reliability test was performed under the following conditions: a direct-current voltage of 50 V was applied at 170° C. A change in insulation resistance with time was measured. The point when the insulation resistance of each sample was 100 kΩ or less was defined as the point when a failure occurred. The mean time to failure (MTTF) was determined. The case where MTTF was 90 hours or more and less than 100 hours was expressed as ○. The case where MTTF was 150 hours or more was expressed as ⊙.

Results of Characteristic Evaluation in Examples and Comparative Examples

Table 1 contains the results of characteristic evaluation in examples and comparative examples.

TABLE 1

| | Ceramic layer for inner layer | | | | | | Ceramic layer for outermost layer portion | | | | | | | | |
|---|---|---|---|---|---|---|---|---|---|---|---|---|---|---|---|
| | | Rare-earth element | | Mn | Mg | Si | | Rare-earth element | | Mn | Mg | Si | Amount eluted in | Occurrence of structural | Discrimination of outer |
| | Main component powder | Type | Part by mole | Part by mole | Part by mole | Part by mole | Main component powder | Type | Part by mole | Part by mole | Part by mole | Part by mole | adipic acid (µmol) | defect | layer | MTTF |
| Example 1 | BaTiO$_3$ | Dy | 0.3 | 0.3 | 1.0 | 1.5 | BaTiO$_3$ | Dy | 0.2 | 0.3 | 1.0 | 1.5 | 1.0 | 0/20 | impossible | ⊙ |
| Example 2 | BaTiO$_3$ | Dy | 0.3 | 0.3 | 1.0 | 1.5 | BaTiO$_3$ | Dy | 0.28 | 0.3 | 1.0 | 1.5 | 2.3 | 0/20 | impossible | ⊙ |
| Example 3 | BaTiO$_3$ | Dy | 0.3 | 0.3 | 1.0 | 1.5 | BaTiO$_3$ | Dy | 0.2 | 0.3 | 1.0 | 1.5 | 1.5 | 0/20 | impossible | ⊙ |
| Example 4 | BaTiO$_3$ | Dy | 0.3 | 0.3 | 1.0 | 1.5 | BaTiO$_3$ | Dy | 0.2 | 0.3 | 1.0 | 1.5 | 1.3 | 0/20 | impossible | ⊙ |
| Example 5 | BaTiO$_3$ | Dy | 0.3 | 0.3 | 1.0 | 1.5 | BaTiO$_3$ | Dy | 0.2 | 0.3 | 0.0 | 1.5 | 1.1 | 0/20 | impossible | ⊙ |
| Example 6 | BaTiO$_3$ | Dy | 0.3 | 0.3 | 1.0 | 1.5 | BaTiO$_3$ | Dy | 0.0 | 0.3 | 0.0 | 1.5 | 0.8 | 0/20 | impossible | ⊙ |
| Example 7 | BaTiO$_3$ | Dy | 1.5 | 0.3 | 1.0 | 1.5 | BaTiO$_3$ | Dy | 0.0 | 0.3 | 1.0 | 1.5 | 3.2 | 0/20 | impossible | ⊙ |
| Example 8 | BaTiO$_3$ | Dy | 0.3 | 0.3 | 1.0 | 1.5 | BaTiO$_3$ | Gd | 0.2 | 0.3 | 1.0 | 1.5 | 1.2 | 0/20 | impossible | ⊙ |
| Example 9 | BaTiO$_3$ | Dy | 0.3 | 0.3 | 1.0 | 1.5 | BaTiO$_3$ | Y | 0.2 | 0.3 | 1.0 | 1.5 | 1.4 | 0/20 | impossible | ⊙ |
| Example 10 | BaTiO$_3$ | Dy | 0.3 | 0.3 | 1.0 | 1.5 | BaTiO$_3$ | La | 0.2 | 0.3 | 1.0 | 1.5 | 1.0 | 0/20 | impossible | ⊙ |
| Example 11 | BaTiO$_3$ | Dy | 0.3 | 0.08 | 1.0 | 1.5 | BaTiO$_3$ | Dy | 0.2 | 0.08 | 1.0 | 1.5 | 0.8 | 0/20 | possible | ⊙ |
| Example 12 | BaTiO$_3$ | Dy | 0.3 | 0.08 | 1.0 | 1.5 | BaTiO$_3$ | Dy | 0.2 | 0.05 | 1.0 | 1.5 | 0.9 | 0/20 | possible | ⊙ |
| Example 13 | BaTiO$_3$ | Dy | 0.3 | 0.08 | 1.0 | 1.5 | BaTiO$_3$ | Dy | 0.2 | 0.0 | 1.0 | 1.5 | 0.9 | 0/20 | possible | ⊙ |
| Example 14 | BaTiO$_3$ | Dy | 0.3 | 0.08 | 1.0 | 1.5 | BaTiO$_3$ | Dy | 0.2 | 0.0 | 0.0 | 1.5 | 0.8 | 0/20 | possible | ⊙ |
| Example 15 | BaTiO$_3$ | Dy | 0.3 | 0.3 | 1.0 | 1.5 | BaTiO$_3$ | Dy | 0.0 | 0.0 | 1.0 | 1.5 | 0.8 | 0/20 | possible | ⊙ |
| Example 16 | BaTiO$_3$ | Dy | 0.3 | 0.3 | 1.0 | 1.5 | BaTiO$_3$ | Dy | 0.0 | 0.0 | 0.0 | 1.5 | 0.8 | 0/20 | possible | ⊙ |
| Example 17 | BaTiO$_3$ | Dy | 1.5 | 0.3 | 1.0 | 1.5 | BaTiO$_3$ | Dy | 0.0 | 0.05 | 1.0 | 1.5 | 3.7 | 0/20 | impossible | ○ |
| Example 18 | (Ba$_{0.93}$Ca$_{0.07}$)TiO$_3$ | Dy | 0.3 | 0.3 | 1.0 | 1.5 | (Ba$_{0.93}$Ca$_{0.07}$)TiO$_3$ | Dy | 0.2 | 0.3 | 1.0 | 1.5 | 0.8 | 0/20 | impossible | ⊙ |
| Example 19 | (Ba$_{0.99}$Sr$_{0.01}$)TiO$_3$ | Dy | 0.3 | 0.3 | 1.0 | 1.5 | (Ba$_{0.99}$Sr$_{0.01}$)TiO$_3$ | Dy | 0.2 | 0.3 | 1.0 | 1.5 | 1.2 | 0/20 | impossible | ⊙ |
| Example 20 | Ba(Ti$_{0.98}$Zr$_{0.02}$)O$_3$ | Dy | 0.3 | 0.3 | 1.0 | 1.5 | Ba(Ti$_{0.98}$Zr$_{0.02}$)O$_3$ | Dy | 0.2 | 0.3 | 1.0 | 1.5 | 0.9 | 0/20 | impossible | ⊙ |
| Example 21 | Ba(Ti$_{0.99}$Hf$_{0.01}$)O$_3$ | Dy | 0.3 | 0.3 | 1.0 | 1.5 | Ba(Ti$_{0.99}$Hf$_{0.01}$)O$_3$ | Dy | 0.2 | 0.3 | 1.0 | 1.5 | 1.0 | 0/20 | impossible | ⊙ |
| Example 22 | BaTiO$_3$ | Dy | 0.3 | 0.3 | 1.0 | 1.5 | (Ba$_{0.93}$Ca$_{0.07}$)TiO$_3$ | Dy | 0.0 | 0.3 | 1.0 | 1.5 | 1.0 | 0/20 | impossible | ⊙ |
| Example 23 | BaTiO$_3$ | Dy | 0.28 | 0.3 | 1.0 | 1.5 | BaTiO$_3$ | Dy | 0.2 | 0.3 | 1.0 | 1.5 | 0.8 | 0/20 | impossible | ⊙ |
| Example 24 | BaTiO$_3$ | Dy | 0.3 | 0.3 | 1.0 | 1.5 | BaTiO$_3$ | Dy | 0.3 | 0.27 | 1.0 | 1.5 | 1.1 | 0/20 | possible | ⊙ |
| *Comparative Example 1 | BaTiO$_3$ | Dy | 0.3 | 0.3 | 1.0 | 1.5 | BaTiO$_3$ | Dy | 0.3 | 0.3 | 1.0 | 1.5 | 10.3 | 20/20 | impossible | ⊙ |
| *Comparative Example 2 | (Ba$_{0.93}$Ca$_{0.07}$)TiO$_3$ | Dy | 0.3 | 0.3 | 1.0 | 1.5 | (Ba$_{0.93}$Ca$_{0.07}$)TiO$_3$ | Dy | 0.3 | 0.3 | 1.0 | 1.5 | 10.1 | 20/20 | impossible | ⊙ |
| *Comparative Example 3 | (Ba$_{0.99}$Sr$_{0.01}$)TiO$_3$ | Dy | 0.3 | 0.3 | 1.0 | 1.5 | (Ba$_{0.99}$Sr$_{0.01}$)TiO$_3$ | Dy | 0.3 | 0.3 | 1.0 | 1.5 | 13.4 | 20/20 | impossible | ⊙ |
| *Comparative Example 4 | Ba(Ti$_{0.98}$Zr$_{0.02}$)O$_3$ | Dy | 0.3 | 0.3 | 1.0 | 1.5 | Ba(Ti$_{0.98}$Zr$_{0.02}$)O$_3$ | Dy | 0.3 | 0.3 | 1.0 | 1.5 | 11.3 | 20/20 | impossible | ⊙ |
| *Comparative Example 5 | Ba(Ti$_{0.99}$Hf$_{0.01}$)O$_3$ | Dy | 0.3 | 0.3 | 1.0 | 1.5 | Ba(Ti$_{0.99}$Hf$_{0.01}$)O$_3$ | Dy | 0.3 | 0.3 | 1.0 | 1.5 | 10.7 | 20/20 | impossible | ⊙ |
| *Comparative Example 6 | BaTiO$_3$ | Dy | 0.3 | 0.3 | 1.0 | 1.5 | (Ba$_{0.93}$Ca$_{0.07}$)TiO$_3$ | Dy | 0.3 | 0.3 | 1.0 | 1.5 | 12.0 | 20/20 | impossible | ⊙ |

*Outside the scope of the present invention

Table 1 indicates that in Examples 1 to 24, the amount eluted in adipic acid (organic acid) is suppressed because the main surfaces 10a and 10b of the multilayer ceramic capacitors 1 are defined by the ceramic layers 22a and 22b having a low rare-earth element concentration. The reason for this is that the rare-earth elements in the intermediate ceramic layers 24a and 24b are less likely to be eluted from the main surfaces 10a and 10b. This also leads to a reduction in the occurrence of the structural defect after solder mounting.

Regarding the multilayer ceramic capacitors 1 in Examples 1 to 24, the reason the resistance to elution is improved is considered as follows: the ceramic layers 22a and 22b having a low rare-earth element concentration are not easily dissolved in a water-soluble flux (containing an organic acid), thus improving acid resistance. In other words, the rare-earth elements diffuse into the perovskite-type compounds during firing. The rates of diffusion thereof are very low. Thus, the concentrations of the rare-earth elements are likely to increase at grain boundaries, so that the rare-earth elements precipitate easily as segregated phases. Ceramic components primarily containing the additive elements also tend to concentrate at a portion with a high rare-earth element concentration. Such grain boundaries and segregated phases are highly soluble in the water-soluble flux. Therefore, reductions in the concentrations of the added rare-earth elements result in an improvement in the resistance to elution in the water-soluble flux.

The results of Example 4 demonstrate that even where the ceramic layers 22a having a low rare-earth element concentration are not arranged in the first ceramic layer 20a and where the ceramic layers 22b having a low rare-earth element concentration are arranged in only the second ceramic layer 20b, the advantageous effects of preferred embodiments of the present invention are achieved.

In each of Examples 12 to 17 and Example 24, the Mn concentration in the material for the green sheets having a low rare-earth element concentration and being formed into the ceramic layers 22a and 22b, was lower than the Mn concentration in the green sheets for the inner layers. Thus, the color of the main surfaces 10a and 10b of the multilayer ceramic capacitor 1 is visually discriminable from the color of the side surfaces 10c and 10d. The color of the main surfaces 10a and 10b (the ceramic layers 22a and 22b having a low rare-earth element concentration) is lighter than that of the side surfaces 10c and 10d (primarily, the intermediate ceramic layers 24a and 24b). Thus, the main surfaces 10a and 10b are easily discriminable from the side surfaces 10c and 10d.

In each of Examples 12 to 17 and Example 24, the reason the color of the main surfaces 10a and 10b (the ceramic layers 22a and 22b having a low rare-earth element concentration) is lighter than that of the side surfaces 10c and 10d (primarily, the ceramic layers 16 for the inner layers) is as follows: Mn imparts resistance to reduction to a dielectric ceramic material such that the dielectric ceramic material is not converted into a semiconductor even if the dielectric ceramic material is fired at a low oxygen partial pressure. Moreover, Mn gives rise to color in the multilayer ceramic capacitor (when $BaTiO_3$ is used as a main component, the capacitor has a brownish color). Thus, a reduction in the amount of added Mn lightens the color.

The results of the high-temperature load reliability test for the multilayer ceramic capacitors 1 in Examples 1 to 24 demonstrated that each of the capacitors in all examples except Example 23 exhibited satisfactory results and had an MTTF of 150 hours or more.

The present invention is not limited to the foregoing preferred embodiments. Various changes may be made within the scope of the invention. Furthermore, the thicknesses of the ceramic layers, the number of layers, the area of the counter electrodes, and the external dimensions of the multilayer ceramic capacitors, for example, are not limited to the preferred embodiments described herein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic capacitor comprising:
a ceramic main body including:
  a first outer layer portion including first ceramic layers;
  a second outer layer portion including second ceramic layers;
  an inner layer portion including third ceramic layers and inner electrodes arranged at a plurality of interfaces between at least some of the third ceramic layers; and
  outer electrodes arranged on surfaces of the ceramic main body and electrically connected to the inner electrodes; wherein
  the first outer layer portion and the second outer layer portion are arranged vertically so as to sandwich the inner layer portion therebetween;
  the third ceramic layers contain a perovskite-type compound represented by $ABO_3$, where A contains one or more of Ba, Sr, and Ca; B contains one or more of Ti, Zr, and Hf; and O represents oxygen, and a rare-earth element;
  an outermost layer portion of at least one of the first and the second outer layer portions including at least a portion of a surface of the ceramic main body contains a perovskite-type compound represented by $A'B'O_3$, where A' contains one or more of Ba, Sr, and Ca; B' contains one or more of Ti, Zr, and Hf; and O represents oxygen, and optionally a rare-earth element that is the same or different as the rare-earth element of the third ceramic layers;
  a mol concentration ($C_R$) of the rare-earth element in the third ceramic layers is greater than a mol concentration ($C_r$) of the rare-earth element in the outermost layer portion, $C_R > C_r$, inclusive of $C_r = 0$; and
  the inner electrodes include Ni or an alloy of Ni.

* * * * *